UNITED STATES PATENT OFFICE.

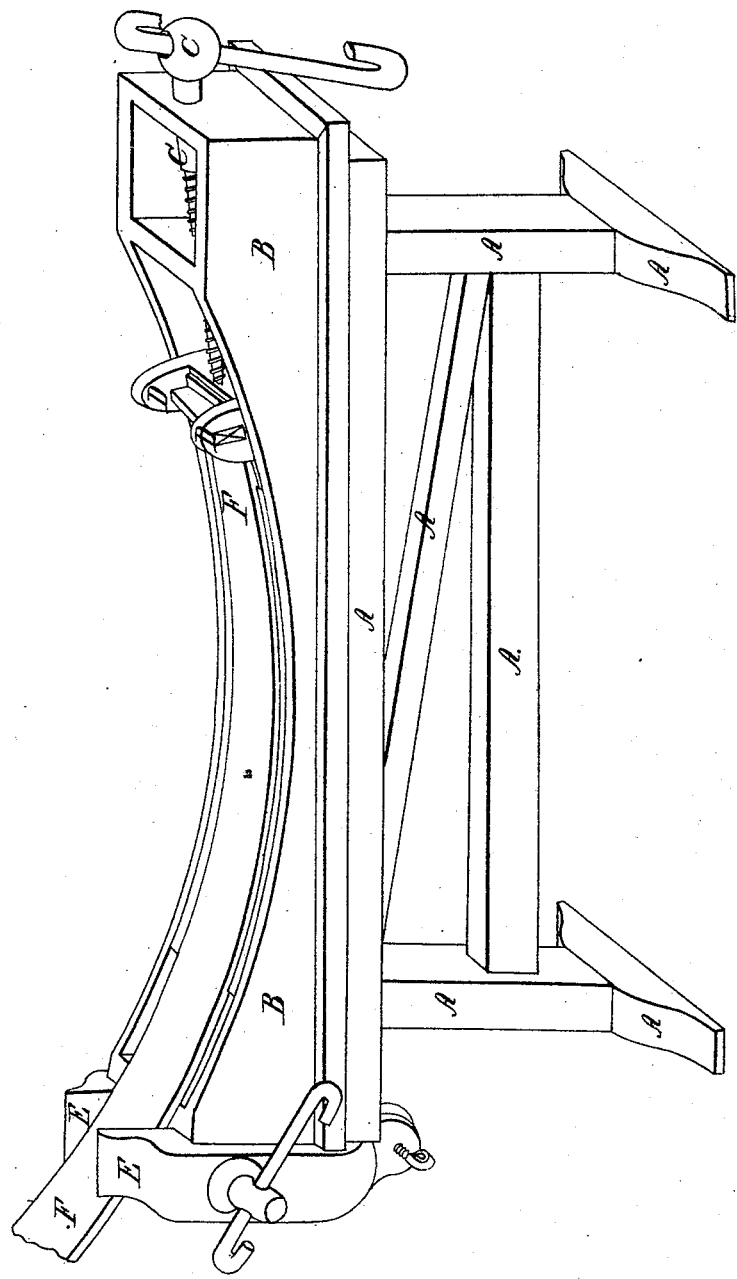

THOMAS PRATT, OF VALPARAISO, INDIANA.

IMPROVEMENT IN TIRE-SHRINKING MACHINES.

Specification forming part of Letters Patent No. 59,967, dated October 23, 1866.

*To all whom it may concern:*

Be it known that I, THOMAS PRATT, of Valparaiso, Porter county, State of Indiana, have invented a new and useful Machine for Upsetting or Shrinking Tires; and I do hereby declare that the following is a full, clear, and exact description of the construction and operation of the same, reference being had to the annexed drawings, making a part of this specification.

A A, &c., is the frame to support the bed-piece B. The bed-piece may be of wood or cast-iron, with a plate of iron on the upper surface for the tire to rest on, with flanges to keep the tire in a right line.

The tire, being properly heated at one point, (tire F F,) is placed in the vise E and gripe D, and the screw C is then applied to the gripe, and knowing the extent to which it is necessary the tire should be shortened, a rule is applied to the tire, and by working the screw the tire is contracted to the required extent.

What I claim as my invention, and desire to secure by Letters Patent, is—

The combination of the flanged bed-piece B, vise E, gripe D, and screw C, when said parts are respectively constructed and the whole arranged substantially in the manner and for the purpose set forth.

THOMAS PRATT.

Witnesses:
 W. J. BAWDEN,
 M. L. McCLELLAND.